Aug. 29, 1950  D. R. SMITH  2,520,859
DRUM TRAP
Filed Feb. 18, 1949  2 Sheets-Sheet 1
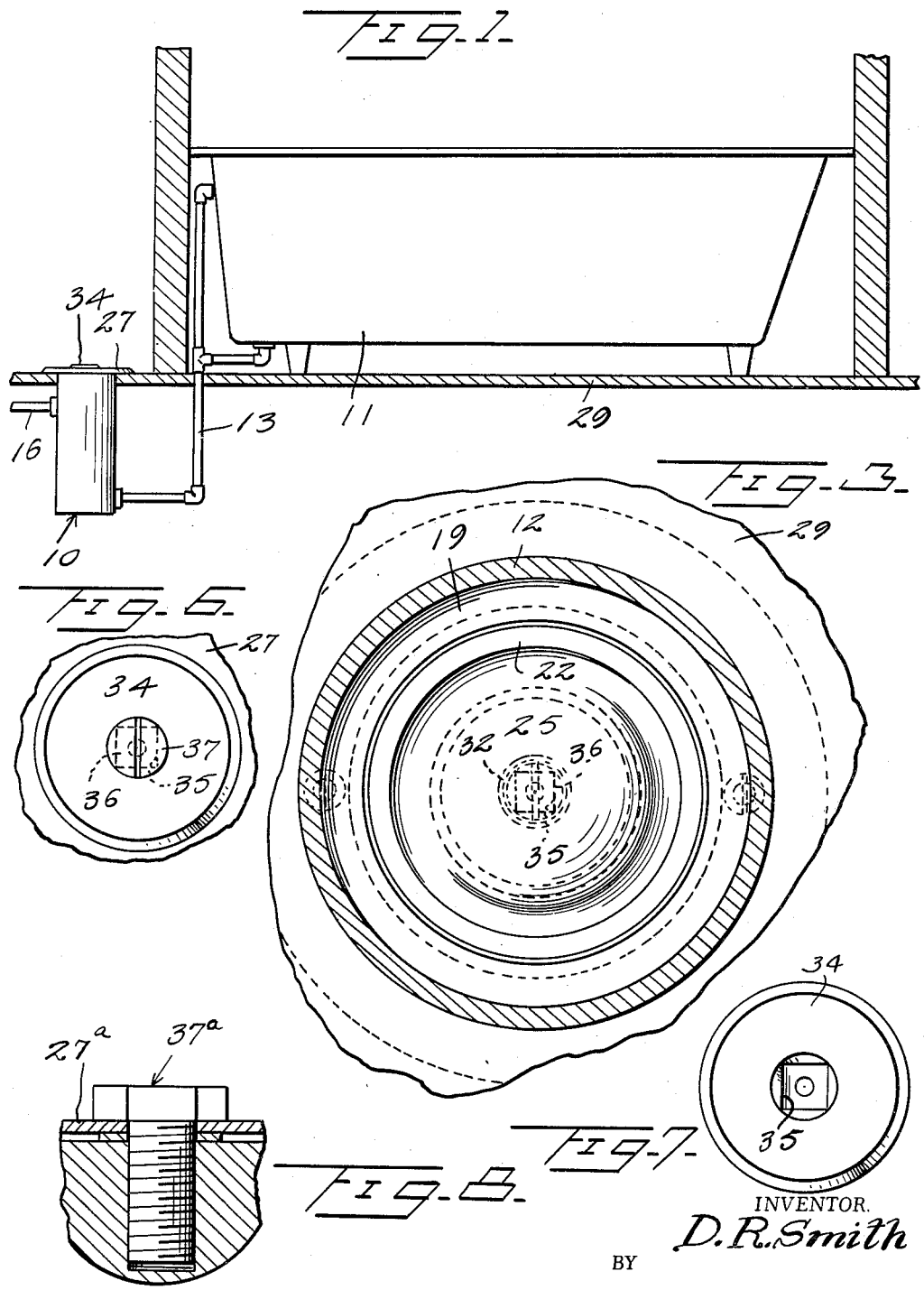
INVENTOR.
D. R. Smith
BY
Kimmel & Crowell Attys.

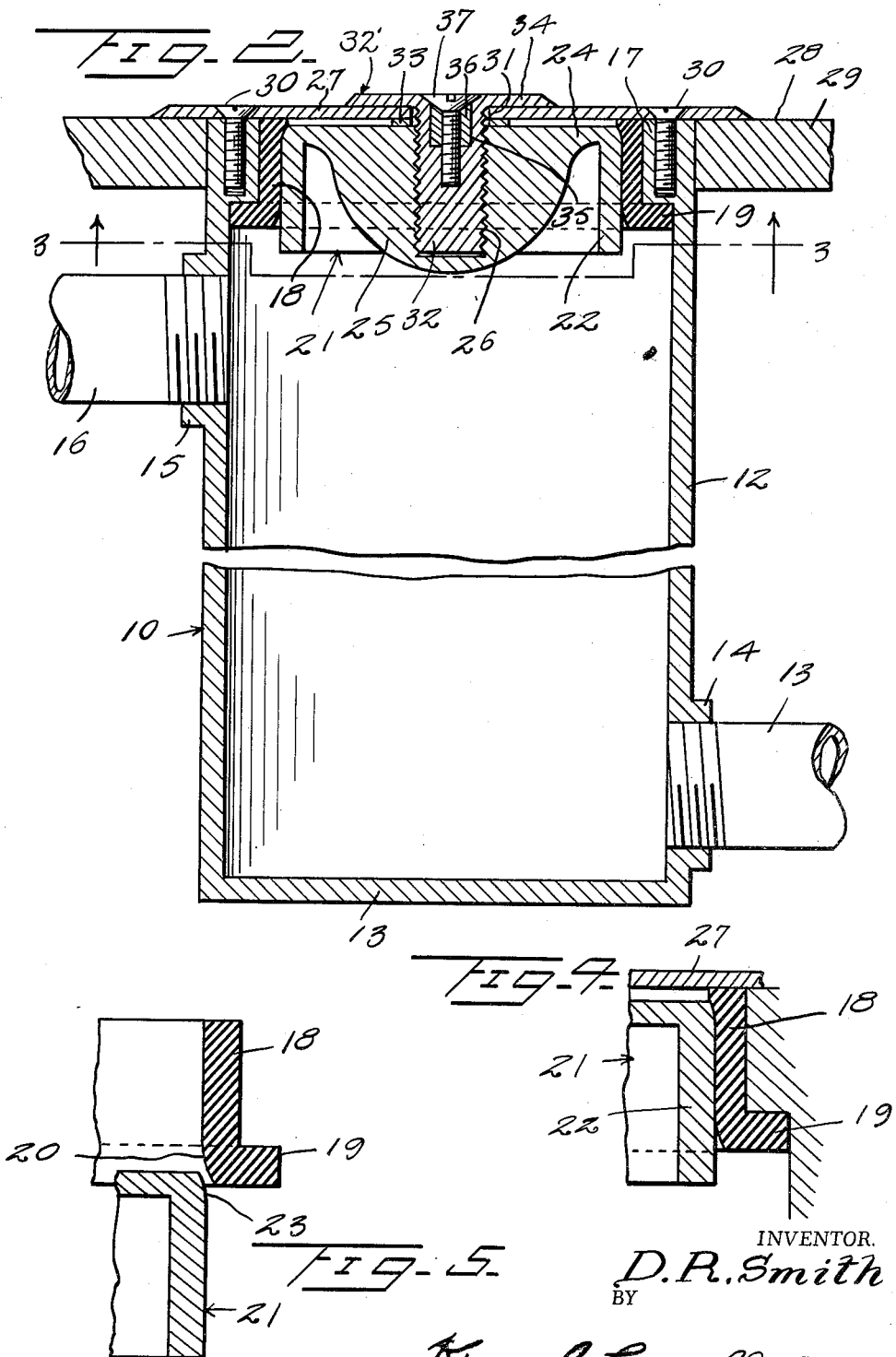

Patented Aug. 29, 1950

2,520,859

UNITED STATES PATENT OFFICE 2,520,859

DRUM TRAP

Daniel R. Smith, Donora, Pa.

Application February 18, 1949, Serial No. 77,242

4 Claims. (Cl. 182—7)

1

This invention relates to fluid and gas traps of the type known as drum traps.

An object of this invention is to provide a trap for plumbing which will effectively seal the plumbing against the backflow of sewer gas, and at the same time permit the cleaning of the trap. The trap herein disclosed is so constructed and arranged that the locking means for the cap will not be subjected to corrosion, and where the trap is inset into a floor only a small portion of the trap will project above the floor.

In one form of the invention the cap is secured in position by means of a conventional cap screw, whereas in the preferred form of this invention the screw is formed with a flat head and a countersunk wrench socket which is normally closed by a removable plug.

With the above and other objects in view, my invention consists in the arrangement, combination and details of construction disclosed in the drawings and specification, and then more particularly pointed out in the appended claims.

In the drawings,

Figure 1 is a detail side elevation of a drum trap constructed according to an embodiment of this invention, showing the trap connected with a bathtub, Figure 2 is a vertical section, partly broken away, through the trap, Figure 3 is a fragmentary sectional view taken on the line 3—3 of Figure 2, Figure 4 is a fragmentary sectional view showing the sealing element in sealed position, Figure 5 is a fragmentary vertical section similar to Figure 4, showing the sealing element and the gasket in partly separated position, Figure 6 is a fragmentary plan view of the cap plate, Figure 7 is a plan view of the clamping bolt embodied in the preferred embodiment of this invention, Figure 8 is a fragmentary sectional view showing a conventional cap screw for use with this invention.

Referring to the drawings, the numeral 10 designates generally a drum trap which is connected to a bathtub 11 by means of a pipe 13. The trap 10 is formed of an upright cylindrical body 12 having a bottom wall 13 and an intake boss 14, with which the pipe 13 is adapted to be connected.

The body or side wall 12 is formed with an outlet boss 15 adjacent the upper portion thereof, with which an outlet or drain pipe 16 is adapted to be connected. The side wall 12 adjacent the upper end thereof is formed with an inwardly projecting annular flange 17, and a cylindrical gasket 18 is adapted to engage on the inner side of the flange 17 and is formed with an annular flange 19 at its lower or inner end, which is adapted to abut against the inner edge of the flange 17.

As shown in Figures 4 and 5, the lower portion of the gasket 18 is flared outwardly as indicated at 20, so as to provide a throat for readily receiving the upper end of a sealing member generally designated as 21. The sealing member 21 is formed of a cylindrical side wall 22 which is tapered at its upper end portion as indicated at 23, to provide for the initial contact between the side wall 22 and the gasket 18. The taper 23 will insure that the sealing member 21 will readily move upwardly to a gasket compressing position after compressing the gasket 18 against the flange 17.

The sealing member 21 includes a top wall 24 formed with an enlarged downwardly projecting body 25 having a centrally disposed internally threaded opening 26. A cap plate 27 is adapted to engage over the top of the trap 10, being of a diameter substantially greater than the diameter of the trap 10 so as to overlie the horizontal surface 28 of a floor 29. The cap plate 27 is secured to the flange 17 by fastening members 30 in the form of countersunk screws, and the plate 27 is formed with a central opening 31 through which the shank 32 of a pressure screw 32' is adapted to loosely engage.

An annular gasket 33 is interposed between the cap plate 27 and the upper side of the top wall 24 and is adapted to be formed of suitable sealing composition. The shank 32 is formed at its upper end with a disc-shaped head 34 engageable on the upper side of the cap plate 27, and the head 34 together with the shank 32, is formed with a centrally disposed polygonal nut socket 35. A polygonal plug 36 is adapted to loosely engage in the socket 35 and the plug 36 is secured in the socket 35 by means of a flat headed screw 37 which extends loosely through the plug 36 and is threaded into the screw shank 32. The head of the screw 37 is slightly larger than the cross sectional area of the plug 36 so that the latter will be completely covered when the screw 37 is in applied position.

In certain instances pressure screw 32' may be substituted by a conventional cap screw 37a as shown in Figure 8. In other respects the structure associated with the cap screw 37a will be identical with that shown in Figure 2.

In the use of this trap, the intake boss 14 is connected with the drain of the bathtub 11 by the pipe 13. The outlet boss 15 is connected with the drain through the pipe 16. By providing a sealing member such as member 21 for closing the upper end of the trap, and by having the threaded opening 26 in the body 25 terminate above the lower end of the body 25, the shank 32 of the pressure screw 32' will not become corroded from any gases or the like in the trap. In this manner the pressure screw can be easily released or reinstated.

A very important feature of this invention is to produce a simple device that is easy of access. It is very important with devices of this kind to be able to very readily and easily open the trap after it has been in use for several years. With most traps after they have been sealed and in use for several years, it is an extremely difficult task to open them. With my invention, to open the trap it is only necessary to remove the fastening members 30 from the cap plate 27, and then to remove the flat headed screw 37 and the polygonal plug 36 from the socket 35. The pressure screw 32' is then partially removed by engaging a conventional socket type wrench within the socket 35, and rotating the latter in a counter-clockwise direction. The cap plate 27 is next lifted to permit a pair of wedges, such as two blocks of wood, to be inserted between the floor 29 and the under-side of the cap plate 27. The sealing member 21 is thus easily removed by rotating the pressure screw by means of the socket wrench in a clockwise direction, whereby the pressure screw functions in the capacity of a jack to lift the sealing member 21 from trap 10. Furthermore, in case an additional floor is laid for example, not more than ⅜-inch thick, the floor plate can still come to the surface of the new floor and still make a perfect seal due to the fact that the side walls 22 of the sealing member 21 are longer than the bearing face of the gasket 18 of the trap.

I do not mean to confine myself to the exact details of construction herein disclosed, but claim all variations falling within the purview of the appended claims.

What I claim is—

1. A drum trap comprising a housing open at the top and having vertically spaced intake and outlet ports, an inner annular flange at the top of said housing, a cylindrical gasket bearing against the vertical side of said flange, an annular flange carried by said gasket bearing against the inner end of said first named flange, an inverted cup-shaped gasket-compressing member for compressing said gasket against said first named flange, a cap plate, means securing said cap plate to the upper end of said housing, and means engaging through said cap plate for drawing said compressing member upwardly to compressing position.

2. A drum trap comprising a housing open at the top and having vertically spaced intake and outlet ports, an inner annular flange at the top of said housing, a cylindrical gasket bearing against the vertical side of said flange, an annular flange carried by said gasket bearing against the inner end of said first named flange, an inverted cup-shaped gasket-compressing member for compressing said gasket against said first named flange, a cap plate, means securing said cap plate to the upper end of said housing, and means engaging through said cap plate for drawing said compressing member upwardly to compressing position, said latter named means comprising a headed screw.

3. A drum trap comprising a housing open at the top and having vertically spaced intake and outlet ports, an inner annular flange at the top of said housing, a cylindrical gasket bearing against the vertical side of said flange, an annular flange carried by said gasket bearing against the inner end of said first named flange, an inverted cup-shaped gasket-compressing member for compressing said gasket against said first named flange, a cap plate, means securing said cap plate to the upper end of said housing, said compressing member having a threaded socket opening through the top thereof, and a headed screw extended through said cap plate and engaging in said socket.

4. A drum trap comprising a housing open at the top and having vertically spaced intake and outlet ports, an inner annular flange at the top of said housing, a cylindrical gasket bearing against the vertical side of said flange, an annular flange carried by said gasket bearing against the inner end of said first named flange, an inverted cup-shaped gasket-compressing member for compressing said gasket against said first named flange, a cap plate, means securing said cap plate to the upper end of said housing, said compressing member having a threaded socket opening through the top thereof, a headed screw extended through said cap plate and engaging in said socket, said screw having a polygonal socket extending downwardly through said head and terminating in the screw shank, a polygonal plug normally filling said latter named socket, and means removably securing said plug in said latter named socket.

DANIEL R. SMITH.

REFERENCES CITED

The following references are of record in the file of this patent:

UNITED STATES PATENTS

| Number | Name | Date |
|---|---|---|
| 996,461 | Costa | June 27, 1911 |
| 1,123,495 | Crosby | Jan. 5, 1915 |
| 1,193,527 | Downey | Aug. 8, 1916 |
| 1,684,572 | Boosey | Sept. 18, 1928 |
| 1,779,102 | Oldfield | Oct. 21, 1930 |
| 1,808,471 | McCarthy | June 2, 1931 |
| 1,999,704 | Rigney | Apr. 30, 1935 |